United States Patent Office 2,719,538
Patented Oct. 4, 1955

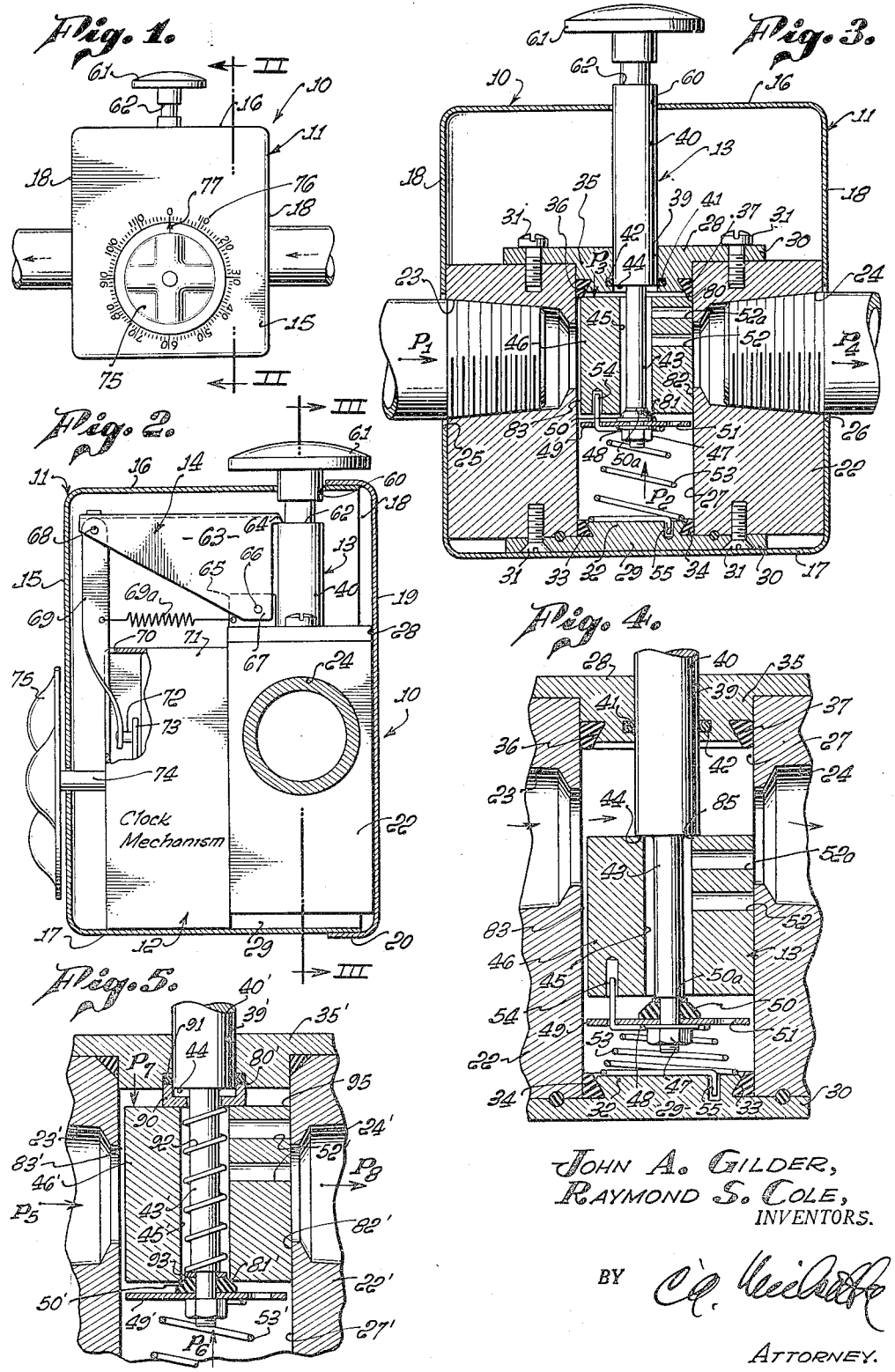

2,719,538

SELF-CLOSING VALVE DEVICE

Raymond S. Cole and John A. Gilder, Los Angeles, Calif.

Application January 26, 1952, Serial No. 268,362

16 Claims. (Cl. 137—630.14)

This invention relates to a valve device for use in a fluid supply line and more particularly to a piston gate-type valve means adapted to be manually opened and set for automatic closure after a selected time interval. The valve device is particularly adapted for use with irrigation or sprinkler systems utilizing usually available water pressure.

One problem presented in the irrigation of soil includes the prevention of water waste by avoiding not only over-saturation of soil but also prevention of excessive run-off of water from the soil. Such water control or conservation includes regulating the flow of water for a selected time period so as to use the water most economically and efficiently in view of the capability of the soil to absorb water. Usually in irrigation systems the valves controlling the flow of water are manually opened and closed. In such a manually operated system, an attendant must return to a particular opened valve to close it at a specified time. Because the attendant must correlate this duty with other interim duties, closure of a valve at a specified time is not usually accomplished and flow of water occurs for a longer period than desired or necessary. There is therefore a definite need for a valve device which may be automatically closed after a selected time period for proper irrigation of the soil for conserving water, and for more efficiently utilizing the time of an attendant.

Some prior proposed valve structures have embodied means for closure of a valve at a selected time, but these proposed valve structures included a complex, expensive arrangement, and the closure mechanism was not always positive in operation when the valve device was operating in a high pressure fluid system. Incomplete closure of such valves obviously permitted undesirable water waste.

This invention contemplates a valve device which will aid in the conservation of water, the saving of labor, and which will obviate the disadvantages of the prior-proposed valve structures for this purpose. The present invention includes a manually opened valve means which is adapted to be adjusted and set at the time of opening for flow of water for a selected time period. At the end of the time period, the valve means is automatically and positively closed. The device includes a timing mechanism, and a latch means cooperable with the valve means for positively holding the valve means in open position, the latch means being releasable by the timing mechanism at the end of the selected period for permitting closure of the valve means. The structure of the valve means of the present invention is such that fluid pressure is utilized to assist and to facilitate the opening and closing of the valve.

The primary object of this invention is, therefore, to design and provide a valve device adapted to conserve water and to reduce labor expenses incurred in operation of an irrigation system.

An object of this invention is to design and provide a valve device which is adapted to be manually opened and set for operation for a selected time interval and wherein the valve device will be automatically actuated to close position at the end of the selected time interval.

Another object of this invention is to design and provide a valve device having a valve structure adapted to take advantage of fluid pressure in the fluid supply line for facilitating opening and closing of the valve.

A further object of this invention is to design and provide a valve device in which the need for close tolerances between parts of the valve is obviated, and wherein a loosely fitting piston-type gate is reciprocally movable within a chamber disposed transversely to the flow of a fluid.

Still another object of this invention is to design and provide a valve device including a valve means and a cooperable latch means which is releasable by a timing mechanism for initiating closure of the valve means after a selected time period.

A still further object of this invention is to design and provide a valve device having relatively few parts and inexpensive to manufacture.

Generally speaking, the valve device includes a valve body having axially aligned inlet and outlet ports, a push-type plunger rod extending into a chamber arranged across and between said ports and in communication therewith, a piston gate or plug loosely carried by the rod and loosely fitted within the chamber for reciprocal movement therein, passageways formed in the plug providing communication between the inlet port and outlet port, one end of the passageway being adapted to be sealed by a valve seat carried by one end of the push rod, the opposite end of said plug being afforded a valve seat against a closure plate for one end of the chamber, and spring means biasing said push rod so that the valve seats are closed when the valve is in closed position. The face of the loosely fitting plug is pressed against the face of the chamber adjacent the outlet port by fluid pressure in the supply line. The particular arrangement of valve seats facilitates opening and closing of the valve means when under pressure as described in detail later.

Other objects and advantages of this invention will be readily apparent from the following description of the drawings.

In the drawings:

Fig. 1 is a front view of a valve device embodying this invention.

Fig. 2 is a partial sectional view of the device shown in Fig. 1, the section being taken in a vertical transverse plane indicated by line II—II of Fig. 1.

Fig. 3 is an enlarged sectional view taken in the plane indicated by line III—III of Fig. 2 and showing the valve means in closed position.

Fig. 4 is an enlarged fragmentary sectional view taken in the same plane as Fig. 3 showing the valve means in open position.

Fig. 5 is an enlarged fragmentary view of a modified valve means embodying this invention, the section being taken in virtually the same plane as that of Fig. 3.

The self-closing time releasable valve device generally indicated at 10, Fig. 1, may include a box-like housing 11 which encloses a timing means 12 and a spring-biased piston-type gate valve means 13. The timing means and valve means are operably connected by a releasable latch means generally indicated at 14 for permitting closure of the valve means after it has been maintained in open position for a selected time period.

The box-like hollow housing 11 may comprise a front wall 15, top and bottom walls 16, 17, and side walls 18. A removable rear wall 19 may be provided with a peripheral flange 20 adapted to enclose edge margins of walls 16, 17 and 18, and to be suitably secured thereto.

Within and at the back of housing 11 is valve means 13, which includes a valve body 22 of elongated rectangular form. Axially aligned, internally threaded, inwardly tapered inlet and outlet ports 23 and 24 may be provided in the valve body, the axis of said ports lying above the horizontal center line of the valve body. Side walls 18 of the housing may be provided with suitable aligned openings 25 and 26 for access to the said ports 23 and 24 to install the valve device in well known manner in a fluid supply line such as a pipe line.

An open-ended vertically disposed cylindrical chamber 27 extends through said body and lies generally perpendicular to the axis of said inlet and outlet ports, said ports extending into communication with said chamber. The chamber 27 may be of uniform diameter throughout its length. The open ends of chamber 27 may be suitably closed by top and bottom closure plates 28 and 29 respectively, each closure plate including a horizontally extending portion 30 overlying adjacent surfaces of valve body 22 and secured thereto as by screw bolts 31 threaded into the valve body.

Bottom closure plate 29 includes a centrally disposed upwardly projecting circular boss 32 having an annular inwardly tapered undercut recess 33 adapted to receive an annular sealing ring 34 having generally a triangular cross section when compressed between the boss 32 and the adjacent wall of chamber 27. Ring 34 may be of any suitable resilient composition material and has an outer diameter slightly greater than the inner diameter of cylindrical chamber 27 so that a positive seal is provided.

The top closure plate 28 also includes similarly shaped circular depending boss 35 which projects downwardly into the top open end of chamber 27. The boss 35 is of relatively thick section or depth and may be provided with an inwardly tapered undercut annular recess 36 for reception of a sealing ring 37. The sealing ring 37, when compressed, has a triangular cross section and a lower annular portion extrudes between the boss 32 and the wall of the chamber and projects below the bottom flat surface of boss 36 for affording a seal with the gate piston 46 as later described.

The top closure plate 28 includes an axial vertical bore 39 for slidable reception of a push-type plunger or actuator rod 40. An annular groove 41 may be provided in bore 39 for a seal ring 42, such as an O ring to seal the bore while permitting sliding reciprocal movement of rod 40 in bore 39.

The push rod 40 includes a lower stem portion 43 of reduced diameter defining a shoulder 44. The stem portion extends through an axial bypass passageway 45 formed in a gate piston 46, the passageway having a uniform diameter throughout its length greater than the diameter of the stem portion and less than the diameter of shoulder 44. Upon downward movement of rod 40, the shoulder may thus be brought into contact or abutment with annular top margins of the piston gate surrounding the top end of passageway 45.

The stem portion 43 extends below the bottom face of the gate piston and carries a securing nut 47 in spaced relation thereto on a threaded reduced end portion. Between the nut 47 and the shoulder formed by the reduced end portion, may be carried a bottom washer 48, a circular pilot disk 49, a frusto-conical valve seat 50, and a top washer 50a. The pilot disk 49 has a diameter less than the inner diameter of the chamber and serves as a guide for maintaining the lower portion of rod 40 in generally axial alignment with the chamber 27. The disk may be perforated as at 51 to facilitate flow of fluid between that portion of the chamber below the disk and the space between the disk and the bottom face of the gate piston.

The valve seat 50 may be of any suitable resilient and yieldable material and is cooperable with the edge defining the lower open end of passageway 45 for sealing thereof in one position of the gate piston. The frusto-conical seal 50 is virtually centered by the guiding action of the pilot disk 49.

The distance between the shoulder 44 and the valve seat 50 is greater than the overall length of the gate piston so that the gate piston is loosely carried by rod 40 and is permitted limited axial movement or end play with respect to rod 40.

The gate piston or plug 46 is reciprocally slidable within the chamber 27. The outer diameter of piston 46 may be uniform throughout its length and is less than the inner diameter of chamber 27 so that the gate piston loosely fits therewithin and is permitted limited lateral movements. The effect of lateral play will be described later with respect to the operation of the valve means. The face of the gate piston on the discharge side is opposed to the inner end of outlet port 24 and substantially covers said port 24 in virtually sealed relation when the gate piston is pressed thereagainst by fluid pressure acting on the inlet side of the valve body.

Vertically spaced transverse bypass passageways 52 and 52a extend between axial passageway 45 and the discharge face of the gate piston. In closed position (Fig. 3) passageway 52 communicates with the outlet port for permitting flow of fluid through passageway 45 from the space between the top face of the gate piston and the bottom face of boss 35, while the upper passageway 52a is closed by a portion of the wall above the outlet port. Thus passageways 45, 52 and 52a provide bypass passageway means in the gate piston 46 for flow of fluid under conditions to be described with respect to operation of the device.

Spring means below the gate piston biases the push rod upwardly for closing the valve means and includes a tapered helical spring 53 having a seat on the top face of the boss 32 on closure plate 29. The top of spring 53 may be seated against disk 49. The spring 53 also serves to restrain the gate piston against rotation by means of top and bottom end portions 54 and 55 respectively which project into securing holes formed in the gate piston and boss 32 respectively. The top end portion 54 extends through an opening in the disk and the hole in the gate piston is of sufficient depth so that end play of the piston will not cause disengagement of the top end portion. The bypass passageways are thus positioned opposite to the outlet port.

The push rod 40 projects upwardly through an aligned opening 60 in top wall 16 of housing 11 and terminates in a wide faced curved knob 61 suitably configured for pressing contact with said knob by a hand. Below knob 61, rod 40 is provided with an annular groove 62 adapted to be cooperable with latch means 14 to positively hold the push rod in down position when the valve means is open.

The latch means 14 serves as means for connecting the push rod 40 to timing means 12 so that the push rod may be released by actuation of the latch means by the timing means. The latching means 14 includes a latching arm 63 having a latch finger 64 adapted to engage the bottom wall defining groove 62 when the valve is in open position. The latching arm may be pivotally connected to a lug 65 provided on said top closure plate 28 adjacent to bore 39, the lug having a pivot pin 66 operable within a curved slot 67 formed in said arm 63. The opposite end of said latching arm 63 may be pivotally connected as at 68 to a downwardly extending spring-biased bar 69 twisted inwardly at its lower end for reception within an opening 70 formed in the casing 71 of the timing means 12. The lower end of bar 69 carries a pin 72 adapted to cooperate with a timing disc 73 provided with an opening therein into which pin 72 is adapted to fall for causing release of the latching means by retracting the latch arm 63. The spring 69a connected at one end to bar 69 and at its other end to lug 65 urges the pin 72 against the timing disk 73. It is understood that other time releasable arrangements may be employed.

The timing disc 73 is carried on a time-driven shaft 74 which projects outwardly through the front wall 15 of the housing 11 and carries a time setting knob 75 for manually adjusting the timing mechanism. As shown in Fig. 1, the front wall 15 may be provided with time indicia 76 covering a selected time period. An index reference mark 77 may be provided on the knob 75 so that the timing disc 73 may be set for a selected number of minutes by rotation thereof after moving the disc axially inwardly to disengage the pin 72 by pressing on knob 75.

In operation of the valve means described above, the time knob 75 may be set to the desired number of minutes during which the valve is to be left in open position. The plunger rod 40 may then be pressed downwardly so as to engage the latching finger 64 with groove 62. The valve is thus held in open position as illustrated in Fig. 4 until the timing means causes retraction of latching finger 64 and the released rod permits the plug 46 to be urged to closed position by spring means 53 and fluid pressure.

The particular manner in which the valve means may be opened while under fluid pressure from the inlet water line is now described in detail. In closed position, the gate piston 46 is disposed as shown in Fig. 3 with the top circumferential marginal surface of the piston seated against the seating ring 37 as at 80. Also valve seat 50 is in sealing contact as at 81 with the bottom annular edge of passageway 45. The discharge face of gate piston 46 seats against the discharge wall of chamber 27 as at 82 because of fluid pressure exerted against the floating gate piston 48 by fluid in the inlet port 23. Because the loose lateral fit of the gate piston within chamber 27 provides clearance at 83 on the inlet side, fluid fills the space below piston 46 and fluid pressure from the supply line acts against the piston in a horizontal direction toward the outlet port and upwardly as indicated by pressure $P_1$ and $P_2$. Pressure $P_1$ and $P_2$ are equal.

When push rod 40 is first pressed downwardly, the seal at 81 of passageway 45 is broken because the gate piston 46 does not move downwardly until shoulder 44 on rod 40 seats as at 85 against the top surface of the gate piston 40 adjacent to the top opening of passageway 45. Breaking of the seal at 81 allows fluid to enter passageways 45 and 52a from the chamber below the gate piston for discharge through outlet port 24. This results in an immediate reduction of pressure $P_2$ which facilitates the breaking of the seal at 80 to allow fluid to fill the space between the top surface of gate piston 46 and the bottom face of boss 35 of the top closure plate. Since shoulder 44 virtually closes at 85 the top open end of passageway 45, fluid from the inlet port flowing through clearance 83 builds up a pressure $P_3$ in this space. Pressure $P_3$ approaches the value of the fluid supply line pressure $P_1$, and since $P_2$ has been substantially reduced by flow of fluid into the outlet port, the differential in pressures between $P_3$ and $P_2$ assists in further downward movement of the gate piston. As the gate piston is moved across the inlet and outlet port openings, the pressures $P_1$, $P_2$ and $P_3$ approach equalization and the final force required to move the gate piston into fully open position is that force required to overcome the resistance of spring 53. When in lowermost position, rod 40 is positively held by the latching finger 64 of latching arm 63.

The rapidity by which the assisting pressure $P_3$ develops depends upon the amount of clearance at 83 for flow of fluid from inlet port 23 to the space above the gate piston 46. While the tolerances illustrated in the drawings are exaggerated for clarity, the dimensional difference between the inner diameter of chamber 27 and the outer diameter of the gate piston is not of such a value that the discharge face of the gate piston is not capable of virtually sealing the opening to the outlet port 24. The flow area provided by the tolerances allowed will determine the rate of buildup of pressure $P_3$ and thus the rapidity with which the gate piston may be urged downwardly without application of excessive forces.

When the latch finger 64 is retracted by operation of the timing means, the actuator rod 40 is released. The spring 53 first urges valve seat 50 into sealing engagement as at 81 with the lower end of passageway 45. At the same time, the seating at 85 of shoulder 44 against the top surface of the gate piston is broken and top end of passageway 45 is opened. As the gate piston moves across the inlet and outlet port openings, the pressure differential between the inlet port pressure $P_1$ and the outlet port pressure $P_4$ increases. Because of the clearance at 83, pressure $P_2$ increases in value and approaches pressure $P_1$. The buildup of pressure $P_2$ assists in lifting the gate piston 46 and with the force exerted by spring 53 causes the top of gate piston 46 to seat as at 80 against the sealing ring 36. As the gate piston has moved upwardly, pressure $P_3$ is reduced by flow of fluid through passageway 45 and the transverse passageways 52 and 52a. When the gate piston is in closed position, pressure $P_3$ is reduced to zero.

The valve means is thus closed automatically upon release of the push rod at the end of a selected time interval, the closing of the valve being assisted by fluid pressure. Thus, insertion of this valve device in a sprinkler system, for example, will enable a sprinkler head to be set for operation for a desired length of time and then left unattended, the flow of water being shut off at a selected time interval without further attention.

In the modification shown in Fig. 5, the valve structure differs in that an upwardly directed flanged or cup-shaped collar 90 is sleeved over stem portion 43' between shoulder 44 and the top surface of the gate piston 46'. The collar 90 provides a seal as at 80' with a seal ring 91 when the valve is in closed position. The collar 90 is biased upwardly by a coil spring 92 sleeved over the stem portion 43' and seated at its lower end on a top washer 93. In this modification parts similar to those described in the first embodiment are given like reference numerals with a prime sign and for brevity similar structure will not be described in detail.

It should be noted that the collar 90 is of substantially less diameter than the inner diameter of chamber 27' so as to allow fluid to act on the top face of the gate piston 46'.

In closed position, fluid pressure in the supply line acts upon the gate piston 46' in the directions indicated by arrows $P_5$, $P_6$, and $P_7$. These pressures hold the gate piston against the discharge face of chamber 27 for virtually sealing the outlet port 24'.

When the push rod is urged downwardly, the seal at 81' is first broken as in the prior modification. Immediate reduction in pressure $P_6$ causes pressure $P_7$ acting on the top of the piston to urge the gate piston 46' downwardly since pressure $P_7$ is substantially equivalent to the fluid supply line pressure $P_5$. When shoulder 44 contacts in downward movement the inner surface of collar 90, the seal at 80' is broken and the collar is held in virtually sealing relation as at 95 over the top opening of passageway 45'. When the top of gate piston 46' moves across the ports 23' and 24', the pressures acting on the gate piston begin to equalize so that when the gate piston is in fully open position pressures $P_5$, $P_6$, $P_7$, and $P_8$ are virtually equal and fluid flows through the valve.

Upon release of the push rod 40' by latch means as contemplated in the prior modification, the valve seat 50' first closes the lower opening of passageway 45' by action of the spring 53'. The top opening of passageway 45' is uncovered because spring 92 urges collar 90 away from its seating at 95 on annular margins surrounding the passageway 45' on the top face of the gate piston. As in the prior modification, the seal at 81' facilitates the buildup of pressure $P_6$, which assists upward movement of gate piston 46'. When the top of the gate piston moves upwardly beyond the outlet port 24', fluid in the space between the top face of piston 46' and the bottom face of closure plate 35' is permitted to escape through passageway 45' and the transverse passageway 52'. Thus, pressure at P7 is reduced until the collar 90 engages seal ring 91 as at 80' and the bottom face of the collar 90 is seated at 95 over the top opening of passageway 45' which is the condition when the gate piston is in fully closed position. In fully closed position, the pressure P7 is equal to the pressures P5 and P6.

The effective force exerted by P6 upon the bottom face of the piston is greater than the effective force exerted by P7 upon the top face of the piston because of the difference in areas upon which the pressures are acting. The top face of the piston is partially covered by the collar 90 and pressure P7 is not effective within the collar. Thus the net effective force acting on the bottom of the piston acts together with the forces of spring 53' to maintain the piston in closed position and to positively seal at 80'.

It will be understood by those skilled in the art that the valve devices disclosed above provide for a loose, free fitting gate piston which is allowed limited lateral and longitudinal movement within a chamber. The loose fit of the gate piston together with the particular arrangement of the bypass passageway means therein and the means for sealing top and bottom openings of said passageway means provides for a valve construction which effectively utilizes fluid pressure to assist opening and closing of the valve device. The utilization of the fluid pressure for closing the valve device when the push rod is released affords a positive method of closure for the valve device.

It will be readily understood by those skilled in the art that various modifications and changes may be made in the valve structure described above and all such modifications and changes coming within the scope of the appended claims are embraced thereby.

We claim:

1. An automatic self-closing valve device including in combination: a valve body provided with a chamber and closure plates for ends of said chamber; inlet and outlet ports to said chamber; a gate piston slidable within said chamber and adapted to close said outlet port in one position, the gate piston being loosely accommodated within the chamber and adapted to lie against the wall of the chamber adjacent to the outlet port when under pressure from fluid in the inlet port whereby space is provided between the gate piston and the wall of the chamber adjacent to the inlet port; bypass means formed in the gate piston and including openings to the chamber above and below the gate piston and communicating passage means adapted to communicate with the outlet port throughout the range of movement of said gate piston; a movable push rod extending into the chamber and loosely carrying the gate piston; spring means within the chamber below the gate piston normally biasing the rod and gate piston into said one position; a seal ring between the top face of the gate piston and the opposed closure plate and operable in said one closed position to seal off the by-pass opening above the gate piston from the inlet port; and means associated with the push rod and selectively cooperable with the openings of the bypass means above and below the gate piston whereby relative movement of the push rod with respect to the gate piston will cause closure of one opening while opening the other opening so that fluid flowing through the space between the gate piston and the wall of the chamber adjacent to the inlet port and into the portion of the chamber placed in communication with said other opening will be reduced in pressure so that fluid pressure at the opposite end of the gate piston will assist in moving said gate piston.

2. An automatic self-closing valve device including in combination: a valve body provided with a chamber; inlet and outlet ports to said chamber; a gate piston slidable within said chamber and adapted to close said outlet port in one position, the gate piston being loosely accommodated within the chamber and adapted to lie against the wall of the chamber adjacent to the outlet port when under pressure from fluid in the inlet port whereby space is provided between the gate piston and the wall of the chamber adjacent to the inlet port; bypass means in the gate piston including an axial passageway having end openings to the chamber above and below the gate piston and communicating passage means to the outlet port in communication therewith throughout the range of movement of the gate piston; a movable push rod extending through the axial passageway and adapted to loosely carry the gate piston; spring means within the chamber below the gate piston normally biasing the rod and gate piston into said one position; a seal means above the gate piston cooperable therewith when the gate piston is in said one position to seal off the opening of the axial passageway to the chamber above the piston from the inlet port; and means carried by the push rod above and below the gate piston and selectively cooperable with the end openings of said axial passageway whereby relative movement of the push rod with respect to the gate piston will selectively close one opening of said passageway while opening the other end opening of said passageway.

3. A device as recited in claim 2, wherein guide means including a perforated disc is carried by the push rod below the gate piston for guiding the push rod.

4. A device as recited in claim 2, wherein the spring means includes end portions cooperable with the gate piston and the valve body for restraining rotation of the gate piston in the chamber.

5. A device as claimed in claim 2, wherein the means carried by the push rod for cooperation with the end openings of the axial passageway include a valve seat carried by the end of the push rod and a shoulder provided on the push rod spaced from the valve seat and having a diameter greater than the axial passageway.

6. In a valve device, the combination of: a valve body having a cylindrical chamber closed at opposite ends; axially aligned inlet and outlet ports communicating with said chamber intermediate ends of the chamber; a loosely fitting slidable cylindrical member reciprocally movable within the chamber and adapted to close the outlet port in one position and movable below the axis of the ports in another position for opening the outlet port; bypass passageway means in said cylindrical member communicating with said outlet port and including bypass openings communicating with end portions of the chamber at opposite ends of the cylindrical member, one end chamber portion being normally in communication with said inlet port; seal means carried by the valve body for the bypass opening communicating with the other end portion of the chamber operative when the cylindrical member is in said one closed position to seal the last mentioned by-pass opening; and an actuator member loosely carrying said slidable member and carrying spaced means for selectively closing the bypass openings to said chamber portions upon relative movement of the actuator member with respect to the slidable member, the relative movement of the actuator member in a selected direction first opening one of the bypass openings and virtually closing the other bypass opening whereby pressure is reduced in the chamber portion at one end of the slidable member by flow of fluid therefrom to said outlet port and whereby pressure acting against the opposite end of the slidable member in which the bypass opening is closed serves to virtually hold the fluid pressure in said chamber for creating a pressure differential between said end chamber portions for assisting movement of the slidable member in the selected direction.

7. In a valve device, the combination of: a valve body having a chamber closed at opposite ends; inlet and outlet ports communicating with said chamber intermediate ends of the chamber; a loosely fitting slidable member reciprocally movable within the chamber and adapted to close the outlet port in one position and movable below the axis of the ports in another position for opening the outlet port; bypass passageway means in said member communicating with said outlet port and including bypass openings communicating with end chamber portions one end chamber portion being normally in communication with the inlet port; seal means in the opposite end chamber portion normally sealing the by-pass opening thereto from the inlet port; spring means carried by the valve body and connected to the slidable member for biasing said member to closed position; and an actuator member loosely carrying said slidable member and carrying spaced means for selectively closing the bypass openings to said chamber portions upon relative movement of the actuator member with respect to the slidable member, the relative movement of the actuator member in a selected direction first opening one of the bypass openings and closing the other bypass opening whereby pressure is reduced in the chamber portion at one end of the slidable member by flow of fluid therefrom to said outlet port and whereby pressure acting against the end of the slidable member in which the bypass opening is closed serves to virtually hold the fluid pressure in said chamber for creating a pressure differential between said chamber portions for assisting movement of the slidable member in the selected direction.

8. A device as recited in claim 7, wherein guide means including an element cooperable with the walls of the chamber are provided for maintaining the actuator member in desired axial position with respect to the chamber.

9. A device as recited in claim 7, wherein the spring includes an element connected to the slidable member in spaced relation to the axis of the member for restraining the slidable member against rotation.

10. A device as recited in claim 7, wherein the spaced means carried by the actuator member include a valve seat cooperable with one bypass opening and a shoulder cooperable with annular margins of the other bypass opening and adapted to virtually close said latter opening.

11. A device as recited in claim 7, wherein a collar member is carried by the actuator member for closing one of said bypass openings.

12. A device as recited in claim 7, including an annular groove provided on said actuator member, and latch means cooperable with said groove for holding the actuator member in one position.

13. In a valve device, the combination of: a valve body having an open ended, vertically arranged chamber; top and bottom closure members for said chamber; inlet and outlet ports communicating with said chamber intermediate ends thereof; a loosely fitting, slidable member movable within said chamber and adapted to close the outlet port in one position and movable to another position for opening the outlet port; bypass means in said member communicating with said outlet port and including bypass openings communicating with end portions of the chamber, at least one of said chamber portions being in communication with the inlet port; an actuator member loosely carrying said slidable member; a seal ring cooperable with the top closure member for sealing the chamber and adapted to contact the slidable member in sealing relation when the member is in closed position; spring means in one of the chamber end portions biasing said slidable member into closed position and spaced means carried by said actuator member for selectively closing the bypass openings to said chamber portions upon relative movement of the actuator member with respect to the slidable member, the relative movement of the actuator member in a selected direction first opening one of the bypass openings and closing the other bypass opening whereby pressure is reduced in one end chamber portion by flow of fluid therefrom to said outlet port and whereby pressure acting against the end of the slidable member in the other end chamber portion to which the bypass opening is closed serves to virtually hold the fluid pressure in said chamber portion for creating a pressure differential between said chamber portions for assisting movement of the slidable member in the selected direction.

14. A valve device as recited in claim 13 wherein the effective area at one end of the slidable member against which fluid pressure may act is greater than the effective area at the other end of said slidable member whereby the net force exerted by the fluid pressure at said one end of the slidable member assists in holding said slidable member in closed position.

15. A self-closing pressure assisted valve comprising in combination: a valve body having an internal chamber closed at opposite ends and inlet and outlet ports to said chamber; a main closure valve member in said chamber slidably operable between said chamber ends and positionable between said inlet and outlet ports in closing relation to the outlet port; a spring biasing the valve member into normally closed position over said outlet port; said main valve member having a surface area exposable to inlet fluid under pressure from the inlet port greater than the surface area of the valve member facing the outlet port; said greater surface area including an area portion adapted to transmit inlet fluid pressure force components in the same direction as the force exerted by said biasing spring; restricted passageway means providing communication between the inlet port and said area portion of the valve member whereby inlet fluid pressure may assist closure of the valve member; communicating passageway means between said area portion and the outlet port; relief valve means in said communicating passageway means operable to release fluid to the outlet port at a flow rate greater than inflow of fluid through the restricted passageway means for reducing pressure differential between the inlet port and the area portion whereby inlet fluid pressure transmitted to surface areas of the valve member other than said area portion assists in opening of the valve member; and an actuator member connected to the relief valve means for opening said relief valve means and having means for closing the communicating passageway means when the relief valve means is open.

16. A self-closing valve as claimed in claim 15 wherein means are carried by the valve body for holding said actuator means in relief valve open position.

References Cited in the file of this patent

UNITED STATES PATENTS

| 1,194,965 | Darrow | Aug. 15, 1916 |
| 1,753,229 | Wolff | Apr. 8, 1930 |
| 2,019,008 | Hauser | Oct. 29, 1935 |